(12) United States Patent
Shah et al.

(10) Patent No.: US 7,799,943 B2
(45) Date of Patent: Sep. 21, 2010

(54) METHOD FOR PROMOTING MICHAEL ADDITION REACTIONS

(75) Inventors: Pankaj V. Shah, Crystal Lake, IL (US); David E. Vietti, Cary, IL (US); David William Whitman, Harleysville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 224 days.

(21) Appl. No.: 11/444,778

(22) Filed: May 30, 2006

(65) Prior Publication Data
US 2009/0275713 A1    Nov. 5, 2009

Related U.S. Application Data

(60) Provisional application No. 60/693,850, filed on Jun. 24, 2005.

(51) Int. Cl.
*C08J 3/24* (2006.01)
*C09J 201/00* (2006.01)
*C08K 3/00* (2006.01)
*C09D 201/00* (2006.01)

(52) U.S. Cl. .................................................... 560/181

(58) Field of Classification Search ........................ None
See application file for complete search history.

(56) References Cited

U.S. PATENT DOCUMENTS

| 5,350,875 | A  | 9/1994 | Kumar et al. |
| 5,430,177 | A  | 7/1995 | Sabahi et al. |
| 5,539,017 | A  | 7/1996 | Rheinberger et al. |
| 2003/0166462 | A1 | 9/2003 | Figueras et al. |
| 2005/0081994 | A1 | 4/2005 | Beckley et al. |

FOREIGN PATENT DOCUMENTS

| EP | 1462501 | 9/2004 |
| JP | 2002-069076 | 3/2002 |
| WO | WO 03/082929 | * 10/2003 |

OTHER PUBLICATIONS

Clemens, et al., "A Comparison of Catalysts for Crosslinking Acetoacetylated Resins via the Michael Reaction", J. Coatings Technology, Mar., 1989, vol. 61, No. 770, pp. 83-91.
Clemens, and Rector, A Comparision of Catalysts for Crosslinking Acetoacyetylated Resins via the Michael Reaction, Journal of Coating Tech, vol. 61, No. 770, pp. 83-91, 1989.

* cited by examiner

*Primary Examiner*—Daniel M Sullivan
*Assistant Examiner*—Yevegeny Valenrod
(74) *Attorney, Agent, or Firm*—Carl P. Hemenway

(57) ABSTRACT

Homogeneously dispersed solid reaction promoters having an average particle size from 0.01 µm to 500 µm are disclosed for preparing curable mixtures of at least one Michael donor and at least one Michael acceptor. The resulting curable mixtures are useful as coatings, adhesives, sealants and elastomers.

14 Claims, No Drawings

METHOD FOR PROMOTING MICHAEL ADDITION REACTIONS

This application claims the benefit of U.S. Provisional Application No. 60/693,850, filed Jun. 24, 2005.

This invention was made in Government support under Contract No. DE-FG36-04GO14317 awarded by the Department of Energy. The Government has certain rights in this invention.

The present invention relates to reaction promoters, including catalysts, useful for facilitating Michael addition reactions. The present invention is directed to homogeneously dispersed solid reaction promoters, including but not limited to catalysts, for facilitating reactions of multifunctional Michael donors and multifunctional Michael acceptors that are used to prepare adhesives, sealants, foams, elastomers, films and coatings. The solid reaction promoters are homogeneously dispersed in curable functional mixtures of multifunctional Michael donors and multifunctional Michael acceptors. The curable functional mixtures are used to prepare a variety of manufactured articles including, but not limited to, bonded laminates, packaging and coated substrates.

The Michael addition reaction is a known chemical process wherein a Michael acceptor is reacted with a Michael donor to elongate a carbon chain in a Michael addition product. Michael addition is taught, for example, by R T Morrison and R N Boyd in *Organic Chemistry*, third edition, Allyn and Bacon, 1973 and by Clemens and Rector (Journal of Coatings Technology, Vol. 61, No. 770, 1989). The reaction is believed to take place between a Michael donor and a Michael acceptor, in the presence of a reaction promoter, namely a base catalyst. However, regardless of the nature of the desired product, homogeneous basic catalysis is achieved by dissolving the base catalyst in one or all reactants or by solubilizing the base catalyst with the aid of a solvent or a phase transfer catalyst.

Curable functional mixtures are mixtures of compounds, including a Michael donor and a Michael acceptor which, in the presence of a reaction promoter, react over time to produce high molecular weight polymers. One problem associated with certain curable functional mixtures containing acids, including functional mixtures prepared from acid containing Michael acceptors and donors, is that the acids are capable of neutralizing all or some of the basic reaction promoter, which slows or suppresses the Michael addition reaction from producing the desired polymer product.

U.S. Pat. No. 5,350,875 discloses the heterogeneously catalyzed reaction of a monofunctional Michael donor with a monofunctional Michael acceptor at a temperature of 0°-150° C., using undissolved basic compounds selected from alkali or alkaline earth metal hydroxides, alkoxides, or carbonates, as the catalyst. The undissolved base catalyst requires removal from the mixture of Michael addition products by filtration in order to minimize polymerization of the Michael acceptor. Moreover, removal of the undissolved catalyst is done for the purposes of promoting formation of Michael addition products that are small molecules in the form of liquids and which have utility as liquid additives such as lubricants and plasticizers. Unfortunately, it is undesirable to remove an undissolved catalyst from a curable functional mixture of multifunctional Michael acceptors and multifunctional Michael donors, because the functional mixture has a rapid cure time and is used directly as an adhesive, a sealant or coating. Moreover, a heterogonous dispersion of undissolved catalyst particles is unacceptable in curable functional mixtures used to manufactured laminated articles, resulting in laminates having undesirable properties and appearance. Heterogeneous catalyst particles can also settle if not constantly agitated, and give an undesirable grainy appearance to adhesives, sealants, elastomers, or coatings and can cause visible defects in articles manufactured using such compositions.

Therefore, it is desirable to provide homogeneously dispersed Michael addition reaction promoters, including but not limited to catalysts, capable of curing mixtures of multifunctional Michael acceptors and multifunctional Michael donors with long pot life and short cure, even in the presence of acid-containing donors, acceptors and additives or curable functional mixtures that are stable to changes in acid levels, while providing smooth appearance and not producing visible defects in manufactured articles.

Inventors have discovered homogeneously dispersed solid reaction promoters, including but not limited to catalysts, that facilitate the cure of mixtures of multifunctional Michael acceptors and multifunctional Michael donors to produce polymers. The curable functional mixtures prepared have relatively long pot lives and short cure times compared to conventionally catalyzed compositions known in the art, even in the presence of acid-containing Michael donors, acceptors and/or additives.

Accordingly, the present invention provides a method for curing a functional mixture comprising the step of: adding one or more homogeneously dispersed solid reaction promoters having an average particle size from 0.01 µm to 500 µm to a portion of, up to and including all of, a curable functional mixture further comprising at least one multi-functional Michael donor and at least one multi-functional Michael acceptor.

The present invention provides a coated article comprising: at least one substrate in contact with a cured functional mixture further comprising (a) one or more homogeneously dispersed solid reaction promoters having an average particle size from 0.01 µm to 500 µm; (b) at least one multi-functional Michael donor; and (c) at least one multi-functional Michael acceptor.

The present invention also provides a bonded article comprising: at least two substrates in contact with a cured functional mixture further comprising (a) one or more homogeneously dispersed solid reaction promoters having an average particle size from 0.01 µm to 500 µm; (b) at least one multi-functional Michael donor; and (c) at least one multi-functional Michael acceptor.

The present invention also provides a curable functional mixture comprising: (a) one or more homogeneously dispersed solid reaction promoters having an average particle size from 0.01 µm to 500 µm; (b) at least one multi-functional Michael donor; and (c) at least one multi-functional Michael acceptor.

In some embodiments, solid reaction promoter is used that has average particle size of 0.1 µm or larger.

As used herein, "(meth)acrylate" means acrylate or methacrylate, and "(meth)acrylic" means acrylic or methacrylic.

As used herein, the term "Michael addition reaction promoter" refers to any solid compound capable of facilitating the reaction of a Michael donor and a Michael acceptor to yield Michael addition products (polymers) of the invention and includes, but is not limited to for example, one or more of a catalyst, a co-catalyst, an acid scavenger and combinations thereof.

A "catalyst", as used herein, is a compound that will catalyze a Michael addition reaction. Without being bound by theory, it is believed that the catalyst abstracts a proton from the Michael donor, generating an enolate anion.

A "co-catalyst", as used herein, is any substance which activates a catalyst, or shifts the equilibrium between protonated Michael donors and enolate anions, thereby increasing the rate of cure of the functional mixture.

An "acid scavenger" as used herein, is a compound that is capable of reacting with an acid by forming a covalent bond, an ionic bond or a complex; the reaction between the acid scavenger and the acid eliminates or reduces the tendency of the acid to participate in interactions with compounds other than the acid scavenger.

As used herein, the term "homogeneously dispersed solid reaction promoter" refers to any solid reaction promoter having an average particle size 500 μm or less or that is uniformly dispersed in a curable functional mixture. In some embodiments, solid reaction promoter is uniformly dispersed in a curable functional mixture and also has average particle size of 500 μm or less, or average particle size of 100 μm or less, or average particle size less than 60 μm.

Reaction promoters that are useful in accordance with the invention include any solid organic compound or any solid inorganic compound or any polymeric solid or any combination thereof that is capable of allowing a Michael addition reaction to proceed to products, and which is substantially insoluble in the reaction mixture.

In some embodiments, suitable solid reaction promoters have an average particle size from 0.01 μm to 60 μm, including an average particle size from 0.01 μm to 20 μm. According to one embodiment the average particle size of the reaction promoter used will vary, depending on the type of adhesive (laminating adhesive having an average particle size from 0.01 μm to 10 μm, pressure sensitive adhesive having an average particle size from 0.01 μm to 20 μm or structural adhesive), sealant or coating required.

In some embodiments, reaction promoters are used that have average particle size of 500 μm or less; or 400 μm or less. In some embodiments, reaction promoters are used that have average particle size of 200 μm or less; or 100 μm or less. In some embodiments, reaction promoters are used that have average particle size of 0.01 μm or greater; or 0.1 μm or greater.

Homogeneously dispersed solid reaction promoters are prepared by any suitable technique including, but not limited to conventional techniques, for example, milling, grinding, or precipitation to obtain an appropriate particle size. Also contemplated is the process of dissolving the solid reaction promoter in a suitable solvent, dispersing the resulting solution within all or a portion of a functional mixture, then removing the solvent via evaporation or extraction to leave behind solid particles of appropriate size.

Suitable solid reaction promoters include, but are not limited to for example, amines, amine-functional polymers, amine-functional resins, any basic metal salts, any alkali metal carbonates, any alkaline earth carbonates, any alkali metal phosphates, any alkaline earth phosphates, any alkali metal hydrogen phosphates, any alkaline earth hydrogen phosphates, any alkali metal phosphate esters, any alkaline earth phosphate esters, any alkali metal pyrophosphates, any alkaline earth pyrophosphates, any alkali metal carboxylates having from 1 to 22 carbon atoms, any alkaline earth carboxylates having from 1 to 22 carbon atoms, and any other suitable transition metal carboxylates having from 1 to 22 carbon atoms. According to one embodiment, mixtures of reaction promoters are also useful in accordance with the invention.

Some additional suitable solid reaction promoters include silicates including, for example, alkali metal silicates, silicates of metals other than alkali metals, and alkaline earth silicates. In some embodiments, aluminum silicate, calcium silicate, sodium silicate, or potassium silicate is used. In some embodiments, sodium silicate or potassium silicate is used.

Additional examples of suitable solid reaction promoters include alkali phenoxide salts, (including, for example, the sodium salt of 4-hydroxymethylbenzoate), alkali metal oxides, alkali metal hydroxides, alkaline earth oxides, alkaline earth hydroxides (including, for example, calcium hydroxide), oxides of metals other than alkali metals, and hydroxides of metals other than alkali metals.

Mixtures of suitable solid reaction promoters are also suitable.

Homogeneously dispersed solid reaction promoters of the invention facilitate the cure of mixtures of multifunctional Michael acceptors and multifunctional Michael donors to produce polymers. Inventors have further discovered that these mixtures have relatively long pot lives and short cure times compared to conventionally catalyzed compositions known to the art, even in the presence of acid containing acceptors, donors, additives and to changes in the acid concentration of the functional mixture.

Without being bound to any particular theory, it is believed that reaction promotion occurs either at the surface of homogeneously dispersed reaction promoter particles, or via mass transport of trace amounts of the reaction promoter into the functional mixture. It is further believed that the homogeneously dispersed solid reaction promoter particles may act as reservoirs which replenish any reaction promoter neutralized by acid residues, either by exposing fresh surface, or by further dissolution to maintain a pseudo-equilibrium trace concentration in solution.

Unexpectedly, it was discovered that homogeneously dispersed solid reaction promoters can be significantly more active than heterogeneously dispersed solid catalysts known in the art. According to one embodiment, the reactivity of homogeneously dispersed solid reaction promoters can be controlled by varying particle size, with smaller particle size being more active.

It was also discovered that addition of small amounts of water increases the reactivity of functional mixtures catalyzed with homogeneously dispersed solid reaction promoters. Addition of small amounts of acid or acid anhydride decreases the reactivity of functional mixtures catalyzed with homogeneously dispersed solid reaction promoters.

Mixtures containing homogeneously dispersed reaction promoters are stable with respect to settling. Functional mixtures cured using homogeneously dispersed solid reaction promoters are useful for bonding two or more substrates, for preparing coated substrates, and for preparing laminating adhesives, product assembly adhesives, home repair adhesives, pressure sensitive adhesives, sealants, foams and elastomers.

In some embodiments, a mixture containing homogeneously dispersed reaction promoter can be made by mixing the particles of reaction promoter with one or more ingredient of the functional mixture of the present invention. For example, one or more Michael acceptor may be mixed with particles of reaction promoter. In some embodiments, such mixing is performed with a high speed mixer or homogenizer.

In some embodiments, such a mixture containing homogeneously dispersed reaction promoter is stable with respect to settling without the presence of any thickeners, dispersants, thixotropic agents or other compounds that promote stability. It is contemplated that, in some embodiments, mixtures will be made without the presence of stability promoting compound when reaction promoter is used that has average particle size of 100 μm or smaller.

In some embodiments, one or more stability promoting compound may be added, including, for example, a thixotropic agent, such as, for example, fumed silica. It is contemplated that, in some embodiments, mixtures will be made that contain a stability promoting compound and a reaction promoter, using a reaction promoter that has average particle size greater than 100 μm. When stability promoting compound is used, in some embodiments the ratio of the weight of reaction promoter to stability promoting compound is 5 or smaller; or 4 or smaller. Independently, in some embodiments in which stability promoting compound is used, the ratio of the weight of reaction promoter to stability promoting compound is 0.5 or larger; or 1 or larger; or 2 or larger.

Some mixtures containing homogeneously dispersed reaction promoters are stable with respect to settling and are also smooth in appearance. Such mixtures can be used to produce articles without visible defects.

In some embodiments, for example, the average particle size of the solid reaction promoter is greater than 100 μm, and the mixture contains one or more compound that promotes stability. In some of such embodiments, the solid reaction promoter contains one or more silicate.

Independently, in some embodiments, for example, the average particle size of the solid reaction promoter is 100 μm or less, and the mixture contains no fumed silica. In some of such embodiments, the mixture contains no thixotropic agent, thickener, or dispersant.

Independently, in some embodiments, for example, the average particle size of the solid reaction promoter is 100 μm or less, and the mixture contains one or more solid reaction product that is not a silicate. In some of such embodiments, the reaction mixture contains one or more solid reaction promoter that is a carbonate (i.e., an alkali metal carbonate or an alkaline earth carbonate).

Independently, in some embodiments, for example, the average particle size of the solid reaction promoter is 100 μm or less; the mixture contains no thixotropic agent, thickener, or dispersant; and the solid reaction promoter contains one or more carbonate.

As used herein, the term "curable functional mixtures" are mixtures of compounds which, in the presence of a reaction promoter, react over time to produce high molecular weight polymeric solids. Curable functional mixtures include, but are not limited to, for example adhesives, sealants, elastomers, coatings and foams.

After mixing, the time period during which a curable functional mixture remains sufficiently liquid to allow coating, molding or shaping operations is called "pot life". The time required for the mixture to polymerize and solidify and show useful end-use properties is called "cure time". It is considered desirable for curable mixtures to have long pot life and short cure time, but it is understood by those having ordinary skill in the art that pot life and cure time are strongly interrelated, so that improvements in pot life are generally accompanied by poorer cure time, and improvements in cure time are generally accompanied by poorer pot life. This interrelationship is due to the common underlying process driving the two factors: increase in molecular weight of the curable functional mixture.

As used herein, "pot life" is the time required for the viscosity of the curable functional mixture to reach a value that is 2 times the viscosity of the freshly-mixed curable functional mixture at a given temperature. The viscosity of the curable functional mixture may be measured by any standard method; one useful viscosity measurement method is the use of a Brookfield viscometer, with the spindle type and rotation speed chosen according to the instructions of the viscometer manufacturer as appropriate for the material to be measured. Long pot life is considered desirable; when formulated to similar cure times, the compositions of the present invention have long pot lives as compared to conventional compositions known in the art.

Cured functional mixtures are obtained by adding one or more homogeneously dispersed solid reaction promoters to a portion of, up to and including all of, a curable functional mixture comprising at least one multi-functional Michael donor and at least one multi-functional Michael acceptor.

A "Michael donor," as used herein, is a compound with at least one Michael donor functional group, which is a functional group containing at least one Michael active hydrogen atom, which is a hydrogen atom attached to a carbon atom that is located between two electron-withdrawing groups such as C=O and/or C≡N. Examples of Michael donor functional groups are malonate esters, acetoacetate esters, malonamides, and acetoacetamides (in which the Michael active hydrogens are attached to the carbon atom between two carbonyl groups); and cyanoacetate esters and cyanoacetamides (in which the Michael active hydrogens are attached to the carbon atom between a carbonyl group and a cyano group). A compound with two or more Michael active hydrogen atoms is known herein as a multi-functional Michael donor. As used herein, the "skeleton" of a Michael donor is the portion of the donor molecule other than the functional group(s) containing Michael active hydrogen atoms.

In some embodiments, at least one Michael donor is used that has two or more separate Michael donor functional groups per molecule. In some embodiments, all Michael donors have two or more separate Michael donor functional groups per molecule.

A "Michael acceptor," as used herein, is a compound with at least one functional group with the structure (I)

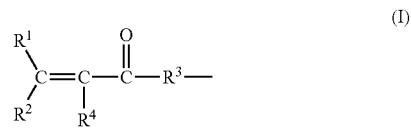

where $R^1$, $R^2$, and $R^4$ are, independently, hydrogen or organic radicals such as for example, alkyl (linear, branched, or cyclic), aryl, aryl-substituted alkyl (also called aralkyl or arylkyl), and alkyl-substituted aryl (also called alkaryl or alkylaryl), including derivatives and substituted versions thereof. $R^1$, $R^2$, and $R^4$ may or may not, independently, contain ether linkages, carboxyl groups, further carbonyl groups, thio analogs thereof, nitrogen-containing groups, or combinations thereof. $R^3$ is oxygen, a nitrogen-containing group, or any of the organic radicals described above for $R^1$, $R^2$, and $R^4$. A compound with two or more functional groups, each containing structure (I), is known herein as a multi-functional Michael acceptor. As used herein, the "skeleton" of a Michael acceptor is the portion of the acceptor molecule other than structure (I). Any structure (I) may be attached to another (I) group or to the skeleton directly.

Suitable skeletons for Michael donors useful in the present invention include alcohols such as methanol, ethanol, propanol, isopropanol, butanol, sec-butanol, tert-butanol, and higher alcohols.

Suitable skeletons for both Michael donors and acceptors useful in the present invention include but are not limited to diols such as ethylene glycol, propylene glycol, propanediol, butanediol, diethylene glycol, neopentyl glycol, triethylene glycol, hexanediol, dipropylene glycol, cyclohexanedimethanol, tetraethylene glycol, 2,2,4-trimethyl-1,3 pentanediol, tripropylene glycol and tricyclodecandedimethylol, triols such as glycerol, propoxylated glycerol, trimethylol propane and castor oil, polyhydric alcohols such as pentaerythritols, dipentaerythritols, polyhydric alkylene oxides and other polyhydric polymers, saccharides including glucose, fructose, maltose, sucrose, sorbital and isosorbide, and epoxides including bisphenol A diglycidyl ether, epoxidized polybutadiene and epoxidized soybean oil. Also contemplated are similar alcohols and epoxides, substituted versions thereof, and mixtures thereof.

In the practice of the present invention, the skeleton of the multi-functional Michael acceptor may be the same or different from the skeleton of the multifunctional Michael donor. It is further contemplated that mixtures containing more than one Michael donor or more than one Michael acceptor may be used.

In the practice of the present invention, the ingredients may be assembled in any combination, in any order. In some embodiments, the ingredients will be added simultaneously or in sequence to a container and mixed. In some embodiments, two or more ingredients will be mixed together and stored as a mixture to be combined with further ingredients at a later time to form the curable functional mixture of the present invention.

The curable mixture of the present invention is capable of curing at 23° C. in 7 days or less. A mixture is considered "cured" when useful strength is developed. For example, the adhesive in a laminate is considered cured if a t-peel test demonstrates significant adhesion, and an elastomer is considered cured if a tensile test demonstrates significant tensile strength. Short cure time is considered desirable; when formulated to similar pot lives, the compositions of the present invention have short cure times as compared to conventional compositions known in the art.

In some embodiments, the cured functional mixture contains polymer. In some embodiments, the cured functional mixture has weight-average molecular weight (Mw) or 10,000 or higher; or 20,000 or higher; or 50,000 or higher; or 100,000 or higher. Independently, in some embodiments, each molecule of the cured functional mixture contains more than 30 residues of Michael acceptor molecules; or more than 50 residues of Michael acceptor molecules.

In some embodiments, the cured functional mixture is used without removing dispersed solid reaction promoter from the composition. That is, in such embodiments, the cured functional mixture is put into use, for example as a coating, adhesive, sealant, elastomer, or foam, with the solid reaction promoter that was present during the cure process left in place within the cured functional mixture.

The cured functional mixture of the present invention may have any of a wide range of glass transition temperature (Tg). In some embodiments, the cured functional mixture will have a Tg of −80° C. or higher. Independently, in some embodiments, the cured functional mixture will have a Tg of 120° C. or lower. The Tg or multiple Tg's will be chosen to give the best properties that are desired for the intended use of the cured functional mixture.

For example, when the cured functional mixture is intended for use as a structural adhesive, the functional mixture will usually be chosen so that the cured functional mixture will have a Tg of 50° C. or higher. As another example, when the cured functional mixture is intended for use as a pressure-sensitive adhesive, the functional mixture will usually be chosen so that the cured functional mixture will have a Tg of 15° C. or lower; or 0° C. or lower; or −25° C. or lower; or −50° C. or lower. As yet another example, when the cured functional mixture is intended for use as a laminating adhesive, the functional mixture will usually be chosen so that the cured functional mixture will have a Tg of −30° C. or higher; or −15° C. or higher; or −5° C. or higher; or 15° C. or higher; or 30° C. or higher.

Some embodiments of the present invention involve applying a layer of the curable functional mixture to at least one substrate. The layer may be a continuous or discontinuous film. The method of application may be by any of a number of ways known to those having ordinary skill in the art, such as, for example, brushing, spraying, roller coating, rotogravure coating, flexographic coating, flow coating, curtain coating, dipping, hot melt coating, extrusion, co-extrusion, similar methods, and combinations thereof. In some embodiments, application of a layer of curable mixture to substrate is performed at ambient temperature. In other embodiments, the application may be performed at elevated or reduced temperature, for example to adjust the viscosity of the curable functional mixture.

A wide variety of substrates may be coated in accordance with the invention, including but not limited to for example, polyolefins, such as oriented polypropylene (OPP), SiOx coated OPP, PVDC coated OPP, cast polypropylene, polyethylene, LDPE, PVDC coated LDPE, and polyethylene copolymers, polystyrene, polycarbonate, polyesters, such as polyethylene terephthalate (PET), SiOx coated PET, PVDC coated PET, or polyethylene naphthalate (PEN), polyolefin copolymers, such as ethylene vinyl acetate, ethylene acrylic acid and ethylene vinyl alcohol (EVOH), polyvinylalcohol and copolymers thereof, polyamides such as nylon and metaxylene adipamide (MXD6), polyimides, polyacrylonitrile, polyvinylchloride, polyvinylidene chloride, and polyacrylates, ionomers, polysaccharides, such as regenerated cellulose, and silicone, such as rubbers or sealants, other natural or synthetic rubbers, glassine or paper, clay coated paper, paper board or craft paper, metallized polymer films and vapor deposited metal oxide coated polymer films, such as AlOx, SiOx, or TiOx, inks including polyamide based inks, polyurethane based inks, nitrocellulose based inks, acrylate based inks, and polyvinylbutyral based inks.

The substrates are typically in the form of a film or sheet, though this is not required. The substrate may be a copolymer, a laminate, a co-extrudate, a blend, a coating or a combination of any of the substrates listed above according to the compatibility of the materials with each other. In addition, the substrate may be in the form of a rigid article.

Other suitable substrates include, but are not limited to for example, glass, flooring materials including concrete, metals including aluminum, iron, steel, and brass, ceramics including porcelain, stoneware, alumina, silica and silicon nitride, asphalt, wood products such as lumber, plywood, luan and particle board, and electronic materials including silicon, germanium, gallium arsenide, indium phosphide and gallium phosphide.

According to one embodiment, the substrates may also be pretreated prior to coating by corona treatment, plasma treatment, flame treatment, acid treatments and flame treatments, all of which are known in the art.

After the composition has been applied to the first substrate, it may then be optionally contacted with another substrate to form a composite. The composite so formed is optionally subjected to applied pressure, such as clamping or passing between rollers. In another embodiment of the invention, the composition may be simultaneously or sequentially applied to both surfaces of the first substrate, which composition are then simultaneously or sequentially bonded to two further substrates, which may be the same, or different. It is further contemplated that the composite construction may sequentially be bonded to other substrate(s) using the composition of the invention, or a different composition before or after the process described herein. The first and second substrates to be bonded in the method of this invention may be the same or different and include, for example plastics, metallized plastics, metal, and paper, which may have smooth or structured surfaces and may be provided in the form of rolls, sheets, films, foils and the like. The functional mixture may be applied, for example, at a level of 0.2 to 116 g/m² (0.12 to 71.2 lb/ream).

In accordance with the invention, the curable mixture of the present invention undergoes a chemical reaction, referred to as "cure." While the invention is not limited to any particular theory, it is believed that cure begins when the curable functional mixture is formed and that it continues at least until the end of the pot life, and may continue after that. In some embodiments, before the end of the pot life, a layer of the curable functional mixture will be applied to a substrate. In some of these embodiments, at least one further substrate will be contacted with the layer of curable functional mixture; often, the further substrate will be contacted with the layer of curable functional mixture before the end of the pot life. Thus, in some embodiments, the cure will not finish until after the curable mixture and the substrates are in contact. In other embodiments, most or all of the Michael addition reaction is completed before the curable mixture is in contact with any substrate or while the curable mixture is in contact with only one substrate. In either case, it is contemplated that the cured mixture will form a useful adhesive bond between the substrates.

According to one embodiment of the invention, the curable functional mixture is useful as an adhesive. According to other embodiments, the curable functional mixture is usefully employed as coatings, films, polymeric foams, sealants, and elastomers. When used as a coating, the curable mixture will be applied to a substrate and then allowed to cure, and further substrates will not be brought into contact with the curable mixture.

The curable functional mixture can be prepared by any conventional techniques known in the art. There is no requirement for the order of combining ingredients of the curable functional mixture. According to one embodiment, the curable mixture is formed by admixing the Michael ingredients and reaction promoter; the admixing may be performed by any means. It is contemplated that sufficient agitation will be provided to homogeneously disperse the solid reaction promoter, and either dissolve or homogeneously disperse any other solid ingredients. In some embodiments, the various ingredients may be admixed on a substrate, for example by applying alternate layers of various ingredients or by spraying separate streams of various ingredients onto the same area of the substrate.

In other embodiments, those in which the cured mixture will be used as a sealant, foam or as an elastomer, the curable functional mixture may be formed by mixing the ingredients in a mold or other suitable container and kept therein during the cure reaction. Alternatively, after the ingredients are mixed, the curable functional mixture may be placed into a mold or other suitable container and kept therein during the cure reaction.

In some embodiments, few or no volatile compounds are released during the curing process. For example, in some embodiments, the weight of the curable functional mixture reduces by 10% or less, based on the initial weight of the curable mixture (i.e., the weight of the freshly-mixed curable functional mixture), during the cure. In some embodiments, the weight of the curable functional mixture reduces by 5% or less, or 2% or less, or 1% or less, based on the initial weight of the curable functional mixture, during the curing process.

Among embodiments in which the curable functional mixture will be used to bond similar or dissimilar substrates to each other, in some of these embodiments, the composite will be heated above 23° C. In some embodiments, the curable mixture of the present invention is capable of cure at 23° C., but in some of such embodiments it is desirable to hasten or otherwise improve the cure process by heating the composite to temperature above 23° C. When such heating is performed, the composite may be heated to temperatures above 35° C., or above 50° C., or above 100° C. Also contemplated are embodiments in which the composite is maintained at temperature below 23° C. during the curing process.

According to one embodiment, the curable functional mixture is useful as a laminating adhesive. As used here, laminating adhesives are adhesives suitable for bonding two or more planar substrates together. Laminating adhesives are used, for example, in the preparation of flexible composites such as food packaging, and rigid laminates are used, for example, in the preparation of door panels.

According to another embodiment, the curable functional mixture is a useful sealant. Sealants are materials which are applied at the junction of two articles, to fill the gap between the articles to prevent leaks and to allow for differential expansion and contraction. Examples of sealants include, but are not limited to for example, caulks and glazing compounds.

According to another embodiment, the curable functional mixture is a useful pressure sensitive adhesive composition. Pressure sensitive adhesives are adhesives which exhibit significant tack at room temperature and that firmly adhere to a variety of dissimilar surfaces upon mere contact without the need of more than finger or hand pressure. According to another embodiment, the curable functional mixture is cured in contact with at least one substrate which contains a release coating.

According to another embodiment, the curable functional mixture is a useful product assembly adhesive. Product assembly adhesives are useful for manufacturing articles where two more pieces must be bonded together with a permanent, load bearing bond of sufficient strength. Example product assembly adhesives include, but are not limited to for example, electronic adhesives such as die attach and package sealing adhesives, adhesives for assembling medical devices, and adhesives for consumer goods.

According to another embodiment, the curable functional mixture is a useful home repair adhesive. Home repair adhesives are permanent adhesives suitable for repairing broken articles made of metal, plastic, ceramic, wood or other materials, by bonding two or more pieces together to repair the broken article.

A wide range of laminates are usefully prepared using polymer compositions and curable mixtures of the invention. In some embodiments of the present invention, the substrates are relatively thin and flat, and the resulting composites are called laminates. Some examples of substrates for laminates are polyalkylenes, such as polyethylenes and polypropylenes, polyvinyl chloride, polyesters such as polyethylene terephthalate, polyamides (nylon), ethyl cellulose, cellulose acetate, metallized polypropylene, paper, aluminum foil, other metals, ceramic sheet materials, and related materials, which may be provided in the form of rolls, sheets, films, foils and related forms. Further examples of substrates for laminates are woven or non-woven fabrics, which may be constructed of fibers using one or more natural or synthetic fibers made of materials such as, for example, cotton, wool, rayon, nylon, polyester, polyalkylene, glass, or ceramics.

The cured functional mixture may be used for any of a wide variety of purposes. For example, the cured mixture may be used as an elastomer, either bonded to a substrate or as an elastomeric article. For another example, the cured curable mixture may be formed and cured under conditions that produce a foam. For a further example, a layer of the curable mixture may be applied to a substrate and then left exposed to air to form a coating; such a coating may be continuous or discontinuous; it may be protective or decorative or both; it may function, for example, as a paint, as another type of coating, or as an ink. The use for the cured curable mixture may be, for example, as one or more of a gasket, a sealant, a roofing membrane, or a film.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. As a further, independent, example, if a particular parameter is disclosed to have suitable minima of 1, 2, and 3, and if that parameter is disclosed to have suitable maxima of 9 and 10, then all the following ranges are contemplated: 1 to 9, 1 to 10, 2 to 9, 2 to 10, 3 to 9, and 3 to 10.

The scope of the invention is illustrated using the following examples, which are not intended to be construed as limiting.

EXAMPLES

In the following Examples, these abbreviations and materials are used:

Morecure™ 2000=diacrylate of bisphenol A diglycidyl ether from Rohm and Haas Company.
SR-306HP™=tripropylene glycol diacrylate from Sartomer Company.
Miramer™ M 3160=ethoxylated (6) trimethylolpropane triacrylate, molecular weight 560, manufactured by Miwon Commercial Company Ltd and marketed by Rahn USA Corp.
SS-200=sodium silicate powder, 200 mesh size, from PQ Corp.
Cab-o-Sil™ M-5=fumed silica from Cabot Corp.
Jeffamine™ D-230=polyether diamine from Huntsman Corp.
GTAA=glycerol trisacetoacetate
FRP=fiber reinforced plastic Example 1

Preparation of Monomer Mixture

Morcure™ 2000 (1650 g) and SR-306HP™ (1350 g) were weighed into a 4 liter stainless steel beaker. The mixture was mechanically stirred and warmed to 50° C. to produce a clear solution.

Example 2

Preparation of Homogeneously Dispersed Solid Catalyst in Monomer Mixture

A 1.4 liter horizontal bead mill (Dynomill KDL-Pilot from CB Mills) was charged with 1 mm zirconium silicate beads (2644 g). The monomer mixture from example 1 (2275 g) and sodium carbonate (1225 g) were weighed into a 4 liter stainless steel beaker. The mixture was mechanically mixed, and circulated through the horizontal bead mill for 145 minutes. The resulting mixture had composition 35% sodium carbonate, 36% Morcure™ 2000 and 29% tripropylene glycol diacrylate. The volume mean particle size of the ground catalyst was 0.84 µm, as measured by a Coulter LS-120 laser light scattering instrument.

Example 3

Preparation of Heterogeneous Solid Catalyst Powder

Sodium carbonate was fractionated using 35 and 60 mesh sieves. The material which passed through the 35 mesh sieve and was retained on the 60 mesh sieve was used. Based on the size of the sieve openings, the resulting powder was presumed to have particle size range 250-500 µm, with average size 380 µm.

Example 4

Preparation of Soluble Catalyst/Monomer Solution

Morcure™ 2000 (64.4 g), SR-306HP™ (27.6 g) and potassium acetate (4.5 g) were heated to 70° C. and stirred for 1 hour. The hot mixture was filtered to remove undissolved solids, then allowed to cool to room temperature. Small samples were titrated with 0.1 N hydrochloric acid to determine the amount of dissolved potassium acetate catalyst; the filtered solution had composition 1.9% potassium acetate, 68.7% Morcure™ 2000 and 29.4% tripropylene glycol diacrylate.

Example 5

Preparation of Adhesive Mixture with Homogeneously Dispersed Solid Catalyst

Morcure™ 2000 (11.95 g), SR-306HP™ (4.77 g) and the finely ground catalyst/monomer mixture from example 2 (2.57 g) were heated to 50° C. and stirred to produce a mixture with composition 66.7% Morcure™ 2000, 28.6% tripropylene glycol diacrylate and 4.7% finely ground sodium carbonate solid catalyst. This mixture was a homogeneous suspension which showed no signs of settling after 24 hours at room temperature.

Example 6

Preparation of Adhesive Mixture with Heterogeneous Solid Catalyst

Morcure™ 2000 (12.88 g), SR-306HP (5.52 g) and the sieved catalyst powder from example 3 were heated to 50° C. and stirred to produce a mixture with composition 66.7% Morcure™ 2000, 28.6% SR-306HP and 4.7% coarse sodium carbonate solid catalyst. This suspension had visible catalyst particles which settled to the bottom of the container after 24 hours at room temperature. The mixture was stirred immediately before use to ensure that the catalyst was suspended in the mixture.

Example 7

Preparation of Adhesive Mixture With Dissolved Catalyst

Morcure™ 2000 (1.79 g), SR-306HP™ (0.77 g) and the soluble catalyst solution from example 4 were heated to 50°

C. and stirred to produce a mixture with composition 68.9% Morcure™ 2000, 29.5% SR-306HP™ and 1.6% potassium acetate soluble catalyst.

Example 8

Pot Life of Adhesive Mixtures

The adhesive mixtures of examples 5, 6 and 7, and a sample of trimethylol propane tris-acetoacetate were equilibrated at 35° C. To each adhesive sample, 11.61 g of trimethylol tris-acetoacetate was added. The resulting mixtures were briefly mixed, then viscosity was measured using a Brookfield LVDT viscometer, using spindle 25 at 100 rpm. Initial viscosity was recorded. Pot life was recorded as the time for viscosity to double from the initial viscosity. Results are summarized in Table 1.

TABLE 1

| Adhesive | catalyst type | initial viscosity (cps) | pot life (min) |
|---|---|---|---|
| Example 5 | homogeneously dispersed solid | 518 | 25.3 |
| Example 6 | heterogeneous solid | 398 | >1440 |
| Example 7 | soluble | 739 | 11.7 |

It is seen that the adhesive from example 5 using a homogeneously dispersed solid catalyst gives a pot life greater than 20 minutes, the generally accepted minimum in the converting industry. Example 7 using a soluble catalyst is too reactive, resulting in an unacceptably short pot life. Example 6 was extremely unreactive, showing no sign of cure after 24 hours.

Example 9

Preparation of Laminates

Trimethylol propane tris-acetoacetate (11.61 g) was added to fresh samples of the adhesive mixtures of examples 5, 6 and 7. The samples were mixed briefly, roll coated onto printed PET film (Dupont 48LBT) using a PolyType lab coater, then a 1 mil thick linear low density polyethylene film (Pliant GF-10) was contacted with the adhesive coating. The print on the PET film was composed of Sealtech blue and white inks from Color Converting Industries. Both inks are believed to contain residual acid functionality. Ink coat weight was measured gravimetrically as 1.9 g/m$^2$.

Coat weight of adhesive applied in each case was measured gravimetrically in Table 2:

TABLE 2

| Adhesive | catalyst type | coat weight (g/m$^2$) |
|---|---|---|
| Example 5 | homogeneously dispersed solid | 2.4 |
| Example 6 | heterogeneous solid | 2.6 |
| Example 7 | soluble | 1.9 |

The resulting laminates were allowed to stand at 25° C. and 50% relative humidity for 3 days prior to further testing.

Example 10

Appearance of Laminates

Samples of laminates from example 9 were examined by eye, and using a 25× stereomicroscope. Laminates prepared using adhesives from examples 5 and 7 appeared smooth and uniform. Laminates prepared using the adhesive from example 6 had visible grit which detracted from the appearance.

Example 11

Adhesion of Laminates

Samples of laminates from example 8 were tested for t-peel adhesion as follows. 1" wide strips of each laminate were cut, and the strips were pulled apart in a tensile tester at a speed of 10 in/min. The t-peel adhesion was recorded as the maximum force needed to separate the two films. Four strips were tested for each laminate, and the results were averaged. Results were as follows in Table 3:

TABLE 3

| Adhesive | catalyst type | t-peel (g/in) | failure mode |
|---|---|---|---|
| Example 5 | homogeneously dispersed solid | 586 | PET film failure |
| Example 6 | heterogeneous solid | 2 | adhesive not cured |
| Example 7 | soluble | 2 | adhesive not cured |

It is seen that the laminate prepared using the adhesive from example 7 was uncured after 3 days, despite the high reactivity observed in example 8. It is believed that residual acid from the printed ink was present in sufficient concentration to neutralize a significant fraction of the basic catalyst in the adhesive from example 8.

In sharp contrast, the laminate prepared using the adhesive of example 5 cured to give high adhesion in 3 days, despite having longer pot life than the adhesive of example 7. It is believed that the higher catalyst concentration allowed by using a finely ground solid catalyst provides enough basic functionality to neutralize the residual acid in the ink, while still providing good cure kinetics.

The laminate prepared using the coarse solid adhesive from example 6 was uncured, consistent with the low reactivity observed in example 8. It is seen that finely grinding the solid catalyst dramatically increases its efficacy.

Example 12

Acrylic Base

Acrylic Base was made by mixing the following ingredients. SS-200 and Cab-o-Sil™ M5 were dispersed into the remaining ingredients using a high speed mixer.

| Component | % by weight |
|---|---|
| Mor-cure 2000 | 38.07 |
| Miramer M 3160 | 50.24 |
| SS-200 | 6.76 |
| Jeffamine D-230 | 2.61 |
| Cab-o-sil ™ M-5 | 2.32 |

Example 13

Adhesive

The Acrylic Base of Example 12 was mixed with GTAA. The weight ratio of Acrylic Base to GTAA was 80.34 to 19.66.

Pot life of the mixture was about one hour. Brookfield viscosity at 20° C., 10 rpm, spindle #4, was 2960. Free film of the cured mixture was soft and flexible. Substrate coated with mixture was allowed to cure and was immersed in water for 7 days, after which no blisters were observed.

Example 14

Evaluation of Adhesive

The adhesive of Example 13 was evaluated by lap shear test.

A rectangular piece of substrate was bonded to a separate rectangular piece of the same type of substrate, using the composition of interest, to form a composite structure. At one end of the composite structure was a free portion of the rectangular piece of substrate; at the other end was a portion of the rectangular piece of substrate. A "free" portion of substrate is a portion that is not adjacent to any portion of the separate piece of substrate.

The composite was placed in a tensile tester, with the free portion of one substrate in one jaw and the free portion of the other substrate in the other jaw. The tensile tester was used to pull the jaws apart, and the maximum force was recorded. The experiment is repeated with four identical samples, and the average of the maximum force values is reported. Also recorded is the location of the failure.

The test was performed on "dry" samples (i.e, composite samples that were stored at ambient conditions prior to testing), and the test was also performed on a separate "wet" samples (i.e, composite samples that were stored under water prior to testing). Results were as follows:

| Substrates | Condition | load at failure (kg per square cm (psi)) | Failure Location |
|---|---|---|---|
| metal | dry | 39.5 (562) | 100% M[(1)] |
| metal | wet | 36.4 (517) | 100% M[(1)] |
| FRP | dry | 16.0 (227) | 100% F[(2)] |
| FRP | wet | 16.3 (232) | 100% F[(2)] |

Note
[(1)]Sample failed when metal substrate broke.
Note
[(2)]Sample failed when FRP substrate broke.

We claim:

1. A method for curing a functional mixture comprising the step of: adding one or more homogeneously dispersed solid reaction promoters having an average particle size from 0.01 μm to 500 μm to a portion of, up to and including all of, a curable functional mixture further comprising at least one multi-functional Michael donor and at least one multi-functional Michael acceptor, wherein said solid reaction promoter is uniformly dispersed in said curable functional mixture, wherein said reaction promotor is selected from the group consisting of alkali metal carbonates.

2. The method of claim 1 wherein, the curable functional mixture further comprises 0 to 5% by weight of: (a) water, or (b) one or more acids or (c) one or more acid anhydrides, or combinations thereof.

3. The method of claim 1 wherein said homogeneously dispersed solid reaction promoters has an average particle size from 0.1 μm to 20 μm.

4. The method of claim 1, wherein the one or more homogeneously dispersed solid reaction promoter is sodium carbonate.

5. The method of claim 1, wherein said functional mixture is liquid.

6. The method of claim 1, further comprising the step of allowing said functional mixture to cure to polymerize and solidify.

7. The method of claim 1, further comprising the step of allowing said functional mixture to cure to form a high molecular weight polymeric solid.

8. The method of claim 1, wherein said functional mixture is stable with respect to settling.

9. The method of claim 7, further comprising the step of allowing said functional mixture to cure to polymerize and solidify.

10. The method of claim 1, wherein said functional mixture is capable of curing at 23° C. in 7 days or less.

11. The method of claim 4, wherein the average particle size of said reaction promoter is from 0.01 micrometer to 100 micrometer.

12. The method of claim 4, wherein the average particle size of said reaction promoter is from 0.1 micrometer to 20 micrometer.

13. The method of claim 4, wherein the average particle size of said reaction promoter is from 0.1 micrometer to 100 micrometer.

14. The method of claim 1, wherein the average particle size of said reaction promoter is from 0.01 micrometer to 100 micrometer.

* * * * *